(12) United States Patent
Nester et al.

(10) Patent No.: US 11,933,495 B2
(45) Date of Patent: *Mar. 19, 2024

(54) FLUID BED REGENERATIVE THERMAL OXIDIZER AND A METHOD FOR ITS USE

(71) Applicants: James L. Nester, Telford, PA (US); Rick Reimlinger, Westfield, NJ (US)

(72) Inventors: James L. Nester, Telford, PA (US); Rick Reimlinger, Westfield, NJ (US)

(*) Notice: Subject to any disclaimer, the term of this patent is extended or adjusted under 35 U.S.C. 154(b) by 0 days.

This patent is subject to a terminal disclaimer.

(21) Appl. No.: 17/684,320

(22) Filed: Mar. 1, 2022

(65) Prior Publication Data
US 2022/0186926 A1    Jun. 16, 2022

Related U.S. Application Data

(63) Continuation of application No. 16/595,392, filed on Oct. 7, 2019, now Pat. No. 11,262,068, which is a continuation of application No. 15/345,487, filed on Nov. 7, 2016, now Pat. No. 10,436,441, which is a continuation of application No. 13/840,436, filed on Mar. 15, 2013, now Pat. No. 9,488,372.

(51) Int. Cl.
*F23G 7/06* (2006.01)
*F23L 15/04* (2006.01)

(52) U.S. Cl.
CPC .............. *F23G 7/068* (2013.01); *F23L 15/04* (2013.01); *Y02E 20/34* (2013.01)

(58) Field of Classification Search
CPC .......... F23G 7/068; F23G 7/066; F23G 7/065; F23L 15/04; Y02E 20/34; Y02E 20/348
See application file for complete search history.

(56) References Cited

U.S. PATENT DOCUMENTS 9,488,372 B2 * 11/2016 Nester ..................... F23L 15/04

* cited by examiner

*Primary Examiner* — Alfred Basichas
(74) *Attorney, Agent, or Firm* — MUSKIN & FARMER, LLC; Shawn Farmer

(57) ABSTRACT

The present device is a fluid bed regenerative thermal oxidizer configured to minimize dead spaces within it and eliminate the need for complex valve systems, which are typically required to move treated and untreated air across fixed beds. The present device can be a fluid bed regenerative thermal oxidizer comprising a vertical stack having a combustion chamber near its interior center and desorber shelves located within the vertical stack above the combustion chamber and adsorber shelves located within the vertical stack below the combustion shelves. Ceramic spheres can be used as heat sinks that flow from the desorber shelves, around the combustion chamber and onto the adsorber shelves and then back to the desorber shelves. In this way heat from the combustion can be captured by the heat exchange material on the desorber shelves and released to preheat untreated air on the adsorber shelves.

3 Claims, 10 Drawing Sheets

FLUID BED REGENERATIVE THERMAL OXIDIZER AND A METHOD FOR ITS USE

CROSS-REFERENCE TO RELATED APPLICATIONS

This application is a continuation of nonprovisional application Ser. No. 16/595,392 filed Oct. 7, 2019, which was continuation of nonprovisional application Ser. No. 15/345,487 filed Nov. 7, 2016, which was a continuation of nonprovisional application Ser. No. 13/840,436 filed Mar. 15, 2013, all of which are incorporated by reference herein, in their entireties.

FIELD OF THE INVENTION

The present device relates to thermal oxidizers, generally and regenerative thermal oxidizers (RTOs) specifically.

BACKGROUND

Regenerative Thermal Oxidizers (RTOs) are commonly used as part of industrial processes to treat polluted air. Specifically, RTOs are commonly used to decompose toxic gases and volatile organic compounds (VOCs) that are discharged in industrial process exhausts.

The basic operation of a typical RTO consists of passing a hot gas stream over a heat sink material in one direction and recovering that heat by passing a cold gas stream through that same heat sink material in an alternate cycle to heat the cold gas stream. The heat sinks comprising such systems often comprise one or more beds of ceramic material configured to absorb heat from the exhaust gas, wherein the captured heat is then used to preheat an incoming process gas stream. Preheating this incoming process gas is important because it raises the temperature of the incoming gas closer to the temperature required for combustion, necessitating less energy to attain combustion. In this way RTOs help to more efficiently destroy air pollutants emitted from process exhaust streams by recovering and reusing heat created by these types of combustion systems.

Due to the high thermal energy recovery rate of many RTOs, they are suited to applications with low VOC concentrations but high polluted air flow volumes. As a result, RTOs are commonly used to control air emissions and pollutants from various industrial processes such as those involving automotive painting, industrial packaging, wood engineering, agricultural drying and waste treatment just to name a few.

Today, most existing RTOs rely on some form of ceramic heat sink to provide regenerative heat transfer, and many forms of such elemental ceramic media are currently available. Elemental ceramic media are often provided in the form of small pieces. Such ceramic media can often be in the form of blocks, commonly referred to as "saddles," that are combined to form heat exchange media and comprise multiple tubes or similar openings extending through each block, wherein the tubes or openings are configured to allow air to flow through the block. Due to the fact that these ceramic heat sinks are generally large and bulky, they are commonly assembled into one or more towers, where they remain stationary. A series of valves then directs airflow into and out of each tower, or chambers comprising the towers. RTOs comprising this type of arrangement are referred to as "fixed-bed" design RTOs.

Fixed-bed RTOs are known to have some significant disadvantages. First, it is nearly impossible to distribute airflow uniformly throughout each regenerative bed. As a result, "dead spaces" will exist within almost any fixed-bed RTO system. In such dead spaces, the pollutant containing air will not be effectively treated. A stratification effect occurs when entering airflow is not effectively distributed across the entire heat recovery bed. For instance, airflow is not properly distributed in the corners of fixed bed RTOs. A strategy for minimizing the effect of dead spaces has been to significantly enlarge each unit of the RTO system. This enlargement requires the use of larger ceramic heat recovery chambers to create the fixed-beds, which results in a lower heat transferring efficiency. Ceramic saddles are commonly used as a heat transfer media in RTOs and have a shape that is a composite of a ring shape and a saddle shape. Generally speaking, the smaller the heat transfer particle, the more efficient the heat transfer process will be. For example, less one-inch ceramic saddles are needed than two-inch ceramic saddles to achieve the same degree of thermal efficiency.

The second disadvantage of fixed-bed RTOs is that they require a complex valve system to direct air through the RTO chambers resulting in higher construction and operation costs. These valve systems typically move air first in one direction, then in the opposite direction, known as flow reversal, so that the heat from combustion can be captured by the heat sinks, and can then be used to preheat the next batch of pollutant containing air. Perhaps most importantly, the switching mechanisms comprising these valve systems often allow some of the pollutant containing air, which does not reach the heat sinks, to be released untreated. Such releases can account for the majority of pollutants that are allowed to be emitted from RTO treating systems.

What is needed is an RTO system that can distribute airflow uniformly throughout the RTO's heat sink materials thus reducing or eliminating "dead spaces" while also eliminating flow reversal and the need for complex and inefficient valve systems and large ceramic saddles or other large heat sinks.

SUMMARY OF THE INVENTION

It is an aspect of the present inventive concept to provide one or more fluid bed regenerative thermal oxidizers, which reduce or eliminate dead spaces while also eliminating the need for complex and inefficient valve systems and large ceramic saddles or other large heat sinks.

This aspect can be achieved by a fluid bed regenerative thermal oxidizer comprising: a vertical reactor stack comprising a gas inlet at a lower end of the vertical reactor stack a gas outlet located at the upper end of the vertical reactor stack and a combustion chamber located within the vertical reactor stack between the gas inlet and the gas outlet wherein the combustion chamber also comprises a fuel burner; heat exchange material; one or more adsorber shelf located within the vertical reactor stack and below the combustion chamber configured to allow air to flow through each adsorber shelf and also configured to contain the heat exchange material and allow the heat exchange material to move across each adsorber shelf and exit one end of each adsorber shelf; and one or more desorber shelf located within the vertical reactor stack and above the combustion chamber configured to allow air to flow through each desorber shelf and also configured to contain the heat exchange material and allow the heat exchange material to move across each desorber shelf and exit one end of each desorber shelf and onto one or more adsorber shelves.

This aspect can also be achieved by a fluid bed regenerative thermal oxidizer comprising: A fluid bed regenerative thermal oxidizer, comprising: a vertical reactor stack comprising a gas inlet at a lower end of the vertical reactor stack, a gas outlet located at an upper end of the vertical reactor stack and a combustion chamber located within the vertical reactor stack between the gas inlet and the gas outlet wherein the combustion chamber also comprises a fuel burner; heat exchange material comprising small ceramic balls; one or more adsorber shelf located within the vertical reactor stack and below the combustion chamber configured to allow air to flow through each adsorber shelf and each adsorber shelf is also configured to contain the heat exchange material and each adsorber shelf is configured so that heat exchange material flows from a first end to a second end of each adsorber shelf and configured so that the heat exchange material moves across each adsorber shelf and exits the second end of each adsorber shelf; one or more desorber shelf located within the vertical reactor stack and above the combustion chamber configured to allow air to flow through each desorber shelf and each desorber shelf is also configured to contain the heat exchange material and each desorber shelf is configured so that heat exchange material flows from a first end to a second end of each desorber shelf and configured so that the heat exchange material moves across each desorber shelf and exits the second end of each desorber shelf; an upper heat exchange material container located near the upper end of the vertical reactor stack and a lower heat exchange material container located near the lower end of the vertical reactor stack and a vertical tube connecting the upper heat exchange material container and the lower heat exchange material container; and a heating chamber, having a top end and a bottom end, connected to the vertical reactor stack adjacent to the combustion chamber wherein the heating chamber receives heat exchange material from one or more desorber shelf at its top end and releases heat exchange material onto one or more adsorber shelf at its bottom end.

This aspect can also be achieved by a method for using a fluid bed regenerative thermal oxidizers, the method comprising: providing a fluid bed regenerative thermal oxidizer comprising: a vertical reactor stack comprising a gas inlet at a lower end of the vertical reactor stack a gas outlet located at an upper end of the vertical reactor stack and a combustion chamber located within the vertical reactor stack between the gas inlet and the gas outlet wherein the combustion chamber also comprises a fuel burner; heat exchange material; one or more adsorber shelf located within the vertical reactor stack and below the combustion chamber configured to allow air to flow through each adsorber shelf and also configured to contain the heat exchange material and allow the heat exchange material to move across each adsorber shelf and exit one end of each adsorber shelf; and one or more desorber shelf located within the vertical reactor stack and above the combustion chamber configured to allow air to flow through each desorber shelf and also configured to contain the heat exchange material and allow the heat exchange material to move across each desorber shelf and exit one end of each desorber shelf and onto one or more adsorber shelf; an untreated gas; and a combustion gas; flowing an untreated gas into the fluid bed regenerative thermal oxidizer through the gas inlet and though at least one adsorber shelf containing heat exchange material and into the combustion chamber; adding combustion gas to the combustion chamber and igniting the combustion gas and the untreated gas to form a combusted gas; flowing the combusted gas through at least one desorber shelf containing heat exchange material to heat the heat exchange material; moving the heated heat exchange material from at least one desorber shelf to at least one adsorber shelf; flowing the untreated gas though at least one adsorber shelf containing heated heat exchange material so that the untreated gas is heated by the heated heat exchange material and the heat exchange material is cooled by the untreated gas; and moving the cooled heat exchange material from at least one adsorber shelf to at least one desorber shelf.

BRIEF DESCRIPTION OF THE DRAWINGS

Further features and advantages of the present device, as well as the structure and operation of various embodiments of the present device, will become apparent and more readily appreciated from the following description of the preferred embodiments, taken in conjunction with the accompanying drawings of which.

DETAILED DESCRIPTION

Figure 1A:
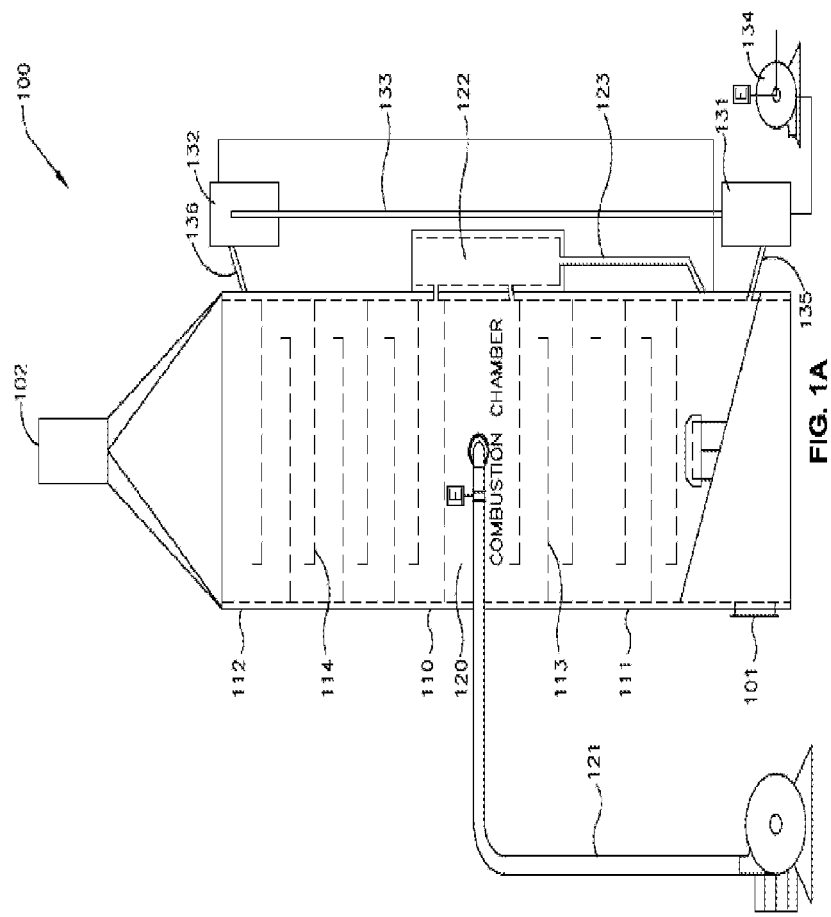
FIG. 1A is a front cutaway view of a fluid bed regenerative thermal oxidizer according to an embodiment.

This description of the exemplary embodiments is intended to be read in connection with the accompanying drawings, which are to be considered part of the entire written description. In the description, relative terms such as "lower," "upper," "horizontal," "vertical,", "above,"

"below," "up," "down," "top" and "bottom" as well as derivatives thereof (e.g., "horizontally," "downwardly," "upwardly," etc.) should be construed to refer to the orientation as then described or as shown in the drawing under discussion. These relative terms are for convenience of description and do not require that the apparatus be constructed oroperated in a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise.

Reference will now be made in detail to the presently preferred embodiments of the invention, examples of which are illustrated in the accompanying drawings, wherein like reference numerals refer to like elements throughout.

Figure 1B:
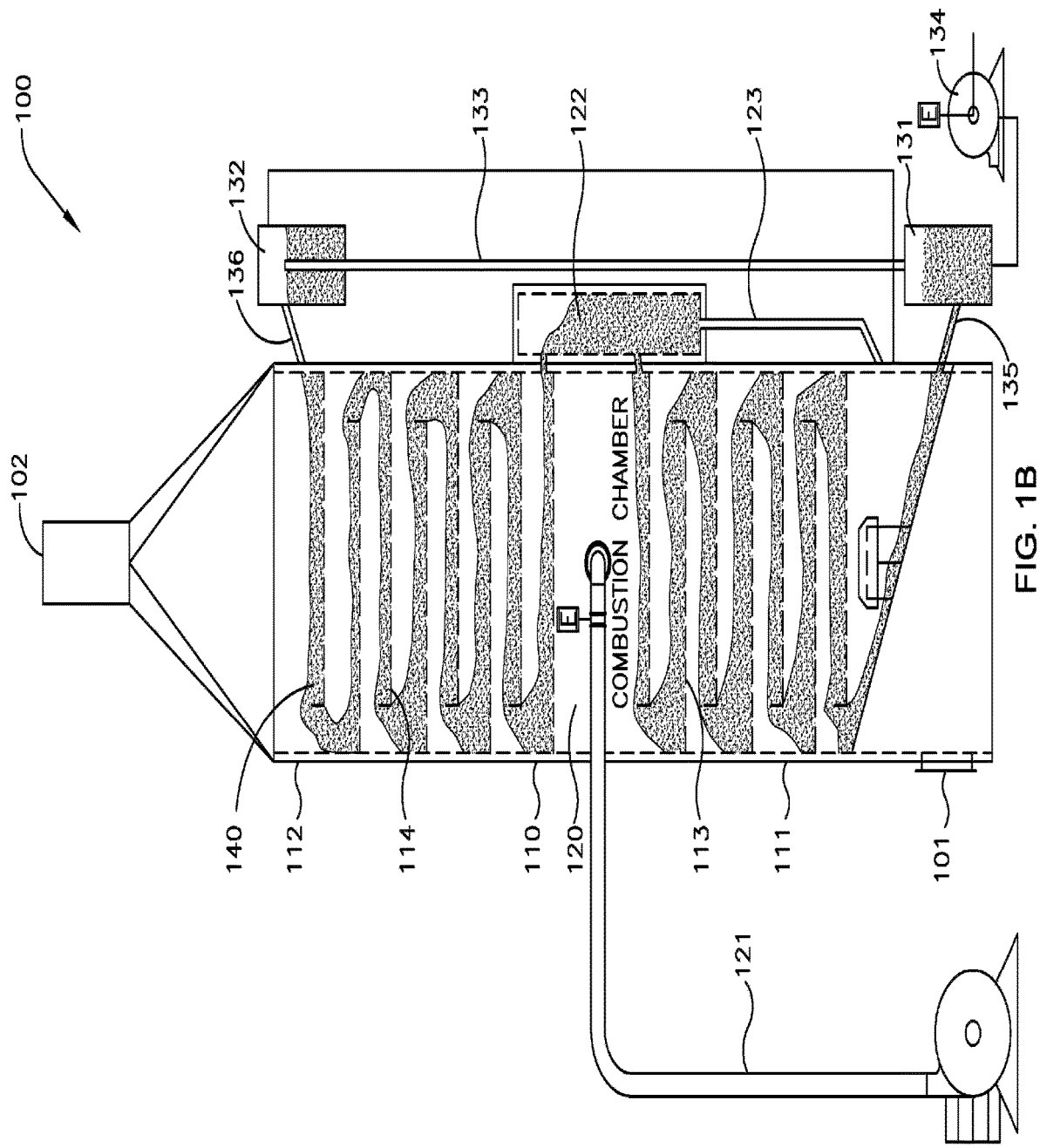
FIG. 1B is a front cutaway view of a fluid bed regenerative thermal oxidizer containing heat exchange material according to an embodiment.

FIG. 1A is a front cutaway view of a fluid bed regenerative thermal oxidizer 100 and FIG. 1B is a front cutaway view of a fluid bed regenerative thermal oxidizer 100 containing heat exchange material 140 according to an embodiment. In an embodiment, the fluid bed regenerative thermal oxidizer 100 can comprise a vertical reactor stack 110 comprising a gas inlet 101 at its lower end 111 and a gas outlet 102 near its upper end 112. Polluted air (not shown), also referred to as untreated air, can flow into the vertical reactor stack 110 through the gas inlet 101 and through the vertical reactor stack 110 and cleaned air can flow out through the gas outlet 102. The vertical reactor stack 110 can comprise a combustion chamber 120 with heat exchange material 140 (not shown in FIG. 1) located above and below the combustion chamber 120. In an embodiment, the heat exchange material 140 can be placed on a plurality of shelves located above and below the combustion chamber 120, which can be configured to allow air to flow through them. Adsorber shelves 113 can be located below the combustion chamber 120 and desorber shelves 114 can be located above the combustion chamber 120. A combustion fuel (not shown) can be introduced into the combustion chamber 120 through a pipe 121. The heat exchange material 140 can move down through the vertical reactor stack 110 by moving from the desorber shelves 114 to the adsorber shelves 113.

In an embodiment the polluted air can flow into the lower end 111 of the vertical reactor stack 110 through the gas inlet 101 and upwards through the vertical reactor stack 110 toward the upper end 112. While traveling upwards through the vertical reactor stack 110, the polluted air can flow through the adsorber shelves 113 containing the heat exchange material 140 allowing heat from the heat exchange material 140 to be transferred to the polluted air. The polluted air can then be combusted in a combustion chamber 120, wherein the heatcreated by this combustion can be transferred from the cleaned air to heat exchange material 140 on the desorber shelves 114 located above the combustion chamber 120. This conserved heat can then be used to heat the polluted gas as the heat exchange material 140 flows from the desorber shelves 114 to the adsorber shelves 113, thus preparing the next batch of polluted gas for combustion, as it passes through adsorber shelves 113 containing heat exchange material 140 located below the combustion chamber 120. The combusted air can flow out of the vertical reactor stack 110 through the gas outlet 102.

In an embodiment, the heated heat exchange material 140 can be fluidized by the hot combusted gas flowing through the heat exchange material 140, which can allow for better heat transfer between the air and the heat exchange material 140. In an embodiment, the heated heat exchange material 140 can move from the desorber shelves 114 located above the combustion chamber 120 and into the side heating chamber 122 then reenter the vertical reactor stack 110 below the combustion chamber 120 where the heated heat exchange material 140 can be used to preheat the incoming polluted air prior to combustion. Heating the incoming polluted air prior to combustion reduces the energy needed to combust the polluted gas air and improves the efficiency of the combustion, thus reducing the amount of pollutant that is allowed to pass out of the vertical reactor stack 110. The heated heat exchange material 140 can cool as it reaches the lower end 111 of the vertical reactor stack 110. In another embodiment, the heated heat exchange material 140 can bypass the adsorber shelves 113 by moving into a bypass tube 123 located outside of the vertical reactor stack 110. This bypass tube 123 can be used to control the amount of heated heat exchange material 140 that can be transported from the heating chamber 122 to the adsorber shelves 113 by reintroducing the heated heat exchange material 140 to the lower end 111 of the vertical reactor stack 110 below the adsorber shelves 113.

The cooled heat exchange material 140 can then be moved to the upper end 112 of the vertical reactor stack 110 above the combustion chamber 120 to start the process over again. In one embodiment, the cooled heat exchange material 140 located below the combustion chamber 120 can be moved into a lower container 131. The lower container 131 can be located on the outside of the lower end 111 of the vertical reactor stack 110 and can be connected to the lower end 111 of the vertical reactor stack 110 though a hollow tube 135. The cooled heat exchange material 140 can move from the lower end 111 of the vertical reactor stack 110 to the lower container 131 through the hollow tube 135. The cooled heat exchange material 140 can then be transported from the lower container 131 to an upper container 132 located on the outside of the upper end 112 of the vertical reactor stack 110 though a vertical hollow tube 133. The upper container 132 can be connected to the upper end 112 of the vertical reactor stack 110 through another hollow tube 136, which can allow the cooled heat exchange material 140 to be moved from the upper container 132 to the upper end 112 of the vertical reactor stack 110. In an embodiment, the cooled heat exchange material 140 can be moved from the lower container 131 to the upper container 132 using an airlift blower 134. In another embodiment, the cooled heat exchange material 140 can be moved to the upper container 132 using a mechanical conveyor (not shown) or any other suitable device or system for moving solid particles from one position to another. In an embodiment, the cooled heat exchange material 140 can enter the upper end 112 of the vertical reactor stack 110 at a rate equal to the rate at which it exits the lower end 111 of the vertical reactor stack 110. The displacement of the heated heat exchange material 140 can allow the heated heat exchange material 140 to move downwards through the vertical reactor stack 110. The process of displacing heated heat exchange material 140 with cooled heat exchange material 140 at the upper end 112 of the vertical reactor stack 110, moving the heated heat exchange material 140 downwards through the upper end 112 and lower end 111 of the vertical reactor stack 110, and moving the cooled heat exchange material 140 to the upper end 112 of the vertical reactor stack 110 can create a continuous cycle allowing heat from the combusted air to be retained and transferred to polluted air yet to be combusted. In an embodiment, the rate at which this cycle is completed, including the velocity at which the heat exchange material 140 moves across the desorber shelves 114 and adsorber shelves 113 and through the vertical reactor stack 110, can be adjusted to optimize the amount heat transfer. This ability to make adjustments regarding heat transfer is important because the optimal amount of preheating will depend upon the contaminants in the polluted air and the velocity with which that air is moving through the fluid bed regenerative thermal oxidizer 100. Efficiency of the fluid bed regenerative thermal oxidizer is a function of the combustion chamber temperature and the amount of time the polluted air spends in the combustion chamber. Therefore, adjusting the air flow rate can increase or decrease the amount of time the polluted air spends in the combustion chamber, affecting the efficiency of the combustion.

Figure 1C:
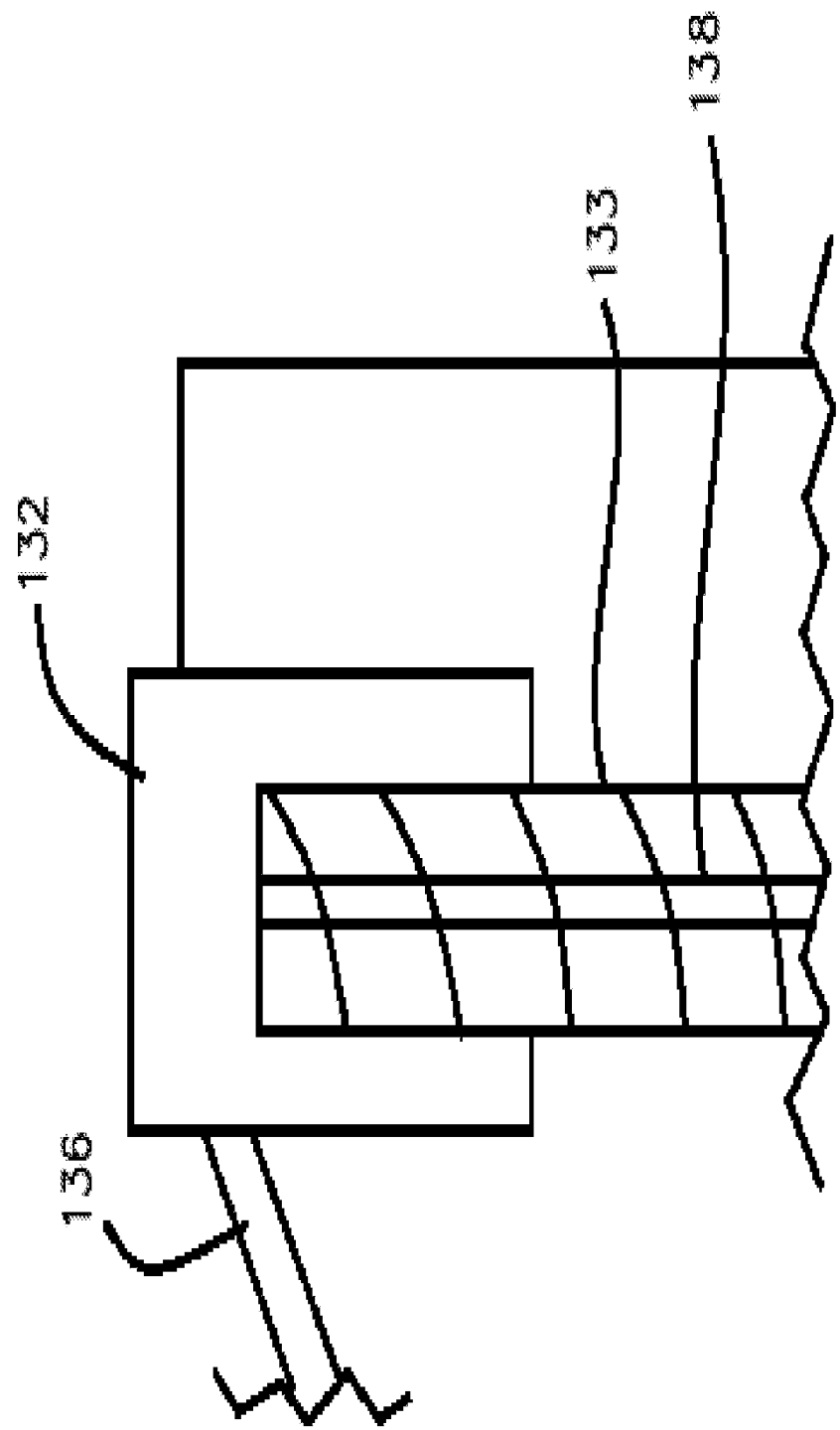
FIG. 1C is a front close-up cutaway view of an upper heat exchange material container connected to a screw conveyor according to an embodiment.

FIG. 1C is a front close-up cutaway view of an upper heat exchange material container 132 and a screw conveyor 137 according to an embodiment. In an embodiment, the cooled heat exchange material 140 shown in FIG. 1B can be moved from the lower container 131 (not shown) to the upper container 132 using a screw conveyor 137.

Figure 2A:
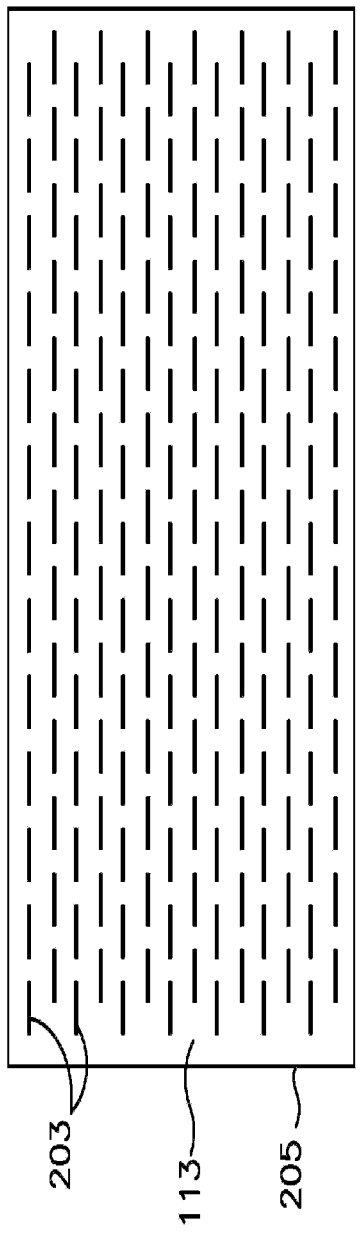
FIG. 2A is a top view of an adsorber shelf according to an embodiment.

FIG. 2A is a top view of an adsorber shelf 113 according to an embodiment. The adsorber shelves 113 can be configured to allow air to flow through the adsorber shelves 113 and to allow the heat exchange material 140 (not shown in FIG. 2A) to move across each adsorber shelf 113 and flow off one edge 205 of each adsorber shelf 113. The adsorber shelves 113 can comprise a plurality of openings 203 sufficient to allow air to flow through the shelves 113. In an embodiment, the openings 203 can be of a sufficient size and be located at a sufficient distance apart so as to allow the heat exchange material 140 to move across the adsorber shelves 113 and not fall through the openings 203.

Figure 2B:
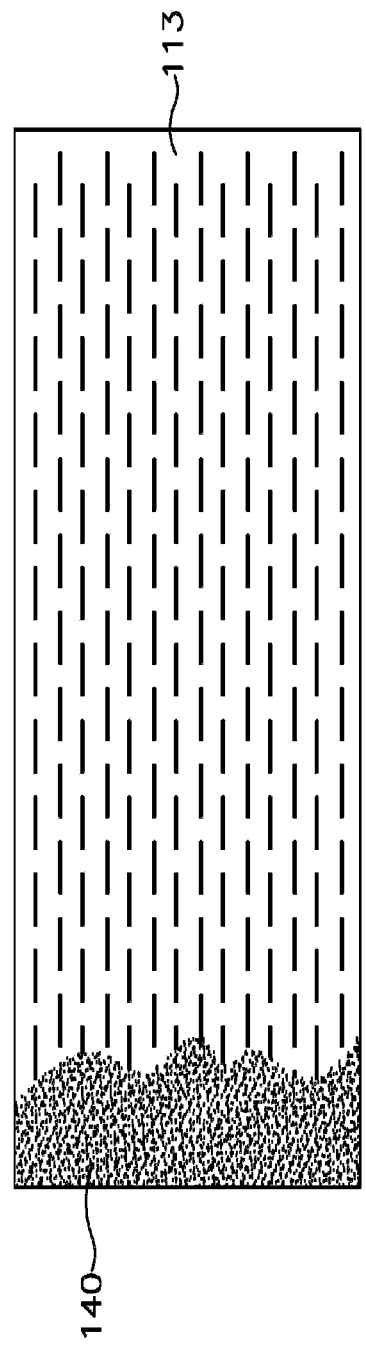
FIG. 2B is a top view of an adsorber shelf containing heat exchange material according to an embodiment.

FIG. 2B is a top view of an adsorber shelf 113 containing heat exchange material 140 according to an embodiment. The heat exchange material 140 can move across the adsorber shelves 113 and down through the lower end 111 of the vertical reactor stack 110 shown in FIG. 1.

Figure 3A:
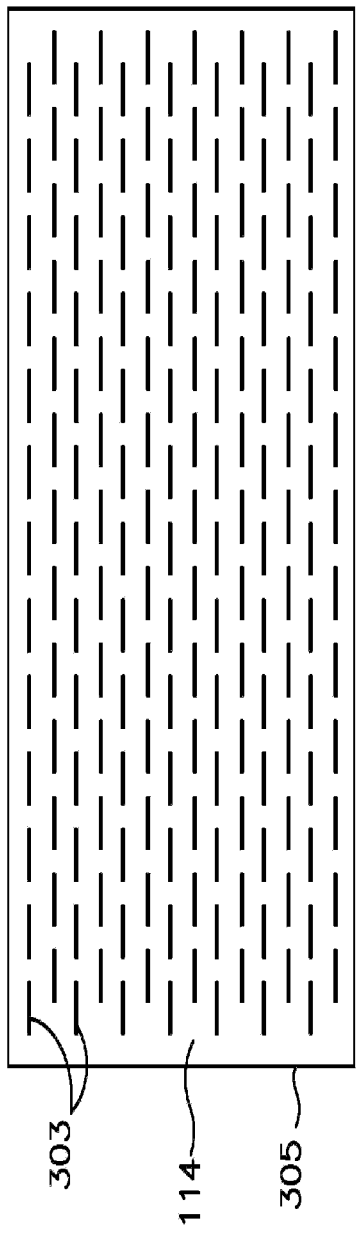
FIG. 3A is a top view of a desorber shelf according to an embodiment.

FIG. 3A is a top view of a desorber shelf 114 according to an embodiment. Each desorber shelf 114 can be configured to allow air to flow through it and to allow the heat exchange material 140 (not shown in FIG. 3A) to move across each desorber shelf 114 and flow off one edge 305 of each desorber shelf 114. Each desorber shelf 114 can comprise a plurality of openings 303 to allow air to flow through it. The openings 303 can be of a sufficient size and located at a sufficient distance apart to allow the heat exchange material 140 to move across the desorber shelves 114 and not fall through the openings 303 according to an embodiment.

Figure 3B:
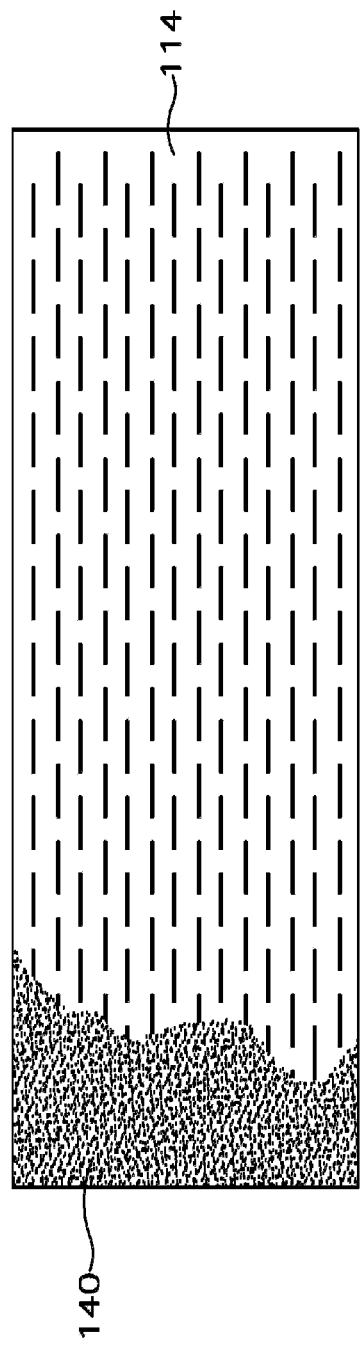
FIG. 3B is a top view of a desorber shelf containing heat exchange material according to an embodiment.

FIG. 3B is a top view of a desorber shelf 114 containing heat exchange material 140 according to an embodiment. The heat exchange material 140 can move across the desorber shelves 114 and down through the upper end 112 of the vertical reactor stack 110 shown in FIG. 1.

Figure 4A:
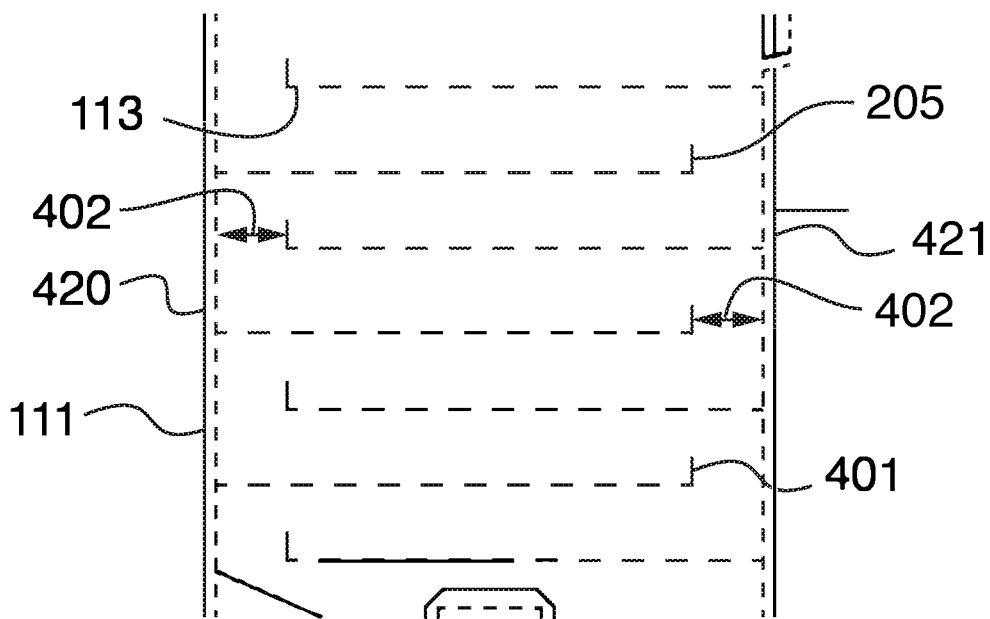
FIG. 4A is a cutaway side view of several adsorber shelves comprising a fluid bed regenerative thermal oxidizer according to an embodiment.

FIG. 4A is a cutaway side view of several adsorber shelves 113 comprising a fluid bed regenerative thermal oxidizer according to an embodiment. The adsorber shelves 113 can be located at the lower end 111, as shown in FIG. 1, of the vertical reactor stack 110. In an embodiment, each adsorber shelf 113 can comprise an edge 205 that does not extend fully to the vertical reactor stack walls 420 and 421. The edge 205 creates an empty space 402 between the edge 205 and the vertical reactor stack left wall 420 or right wall 421. The edge 205 of each adsorber shelf 113 can be located either nearest to the left wall 420 or the right wall 421. In an embodiment, each adsorber shelf 113 can comprise a lip 401 located at the edge 205 of the adsorber shelf 113.

Figure 4B:
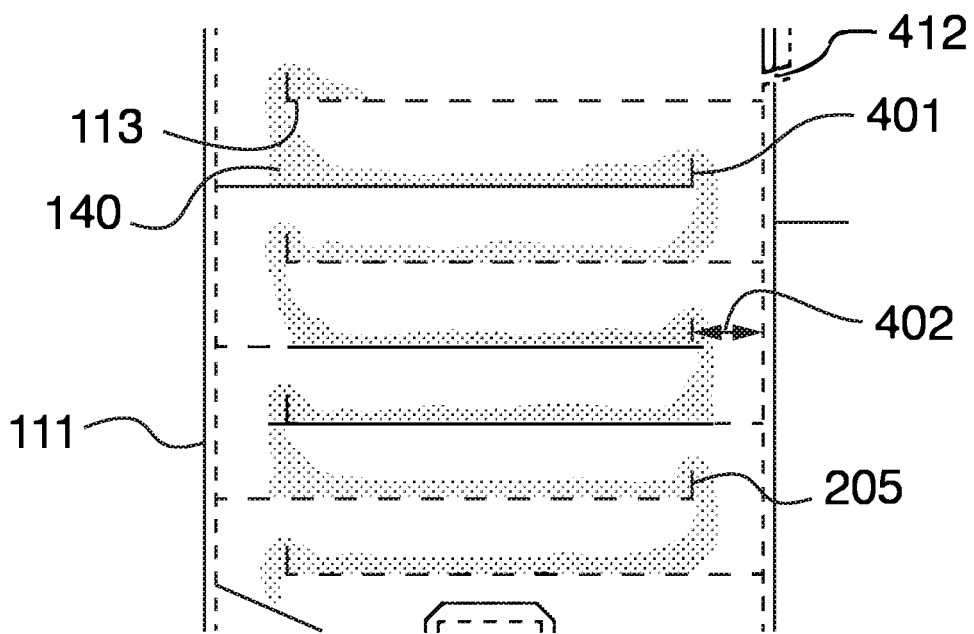
FIG. 4B is a cutaway side view of several adsorber shelves comprising a fluid bed regenerative thermal oxidizer wherein each shelf is shown to contain heat exchange material according to an embodiment.

FIG. 4B is a cutaway side view of several adsorber shelves 113 comprising a fluid bed regenerative thermal oxidizer, wherein each shelf is shown to be containing heat exchange material 140 according to an embodiment. The heat exchange material 140 can move across the adsorber shelves 113 and down through the lower end 111 in FIG. 1 of the vertical reactor stack 110 in FIG. 1. In an embodiment, the heat exchange material 140 can move from an adsorber shelf 113 to the below adsorber shelf 113 by falling down the empty space 402 created by the edge 205 of each adsorber shelf 113 and onto the adsorber shelf 113 located below the adsorber shelf 113 holding the heat exchange material 140. The lip 401 on each adsorber shelf 113 can allow the heat exchange material 140 located on the adsorber shelf 113 to stay in place until sufficient force is placed on the heat exchange material 140 to move the heat exchange material 140 downwards through the lower end 111 in FIG. 1 of the vertical reactor stack 110 in FIG. 1. In an embodiment, the heat exchange material 140 can move from the side heating chamber (not shown) and onto the adsorber shelves 113 through an upper opening 412 and can move downward into the lower container (not shown in FIG. 4B) through a lower opening (not shown in FIG. 4B).

Figure 5A:
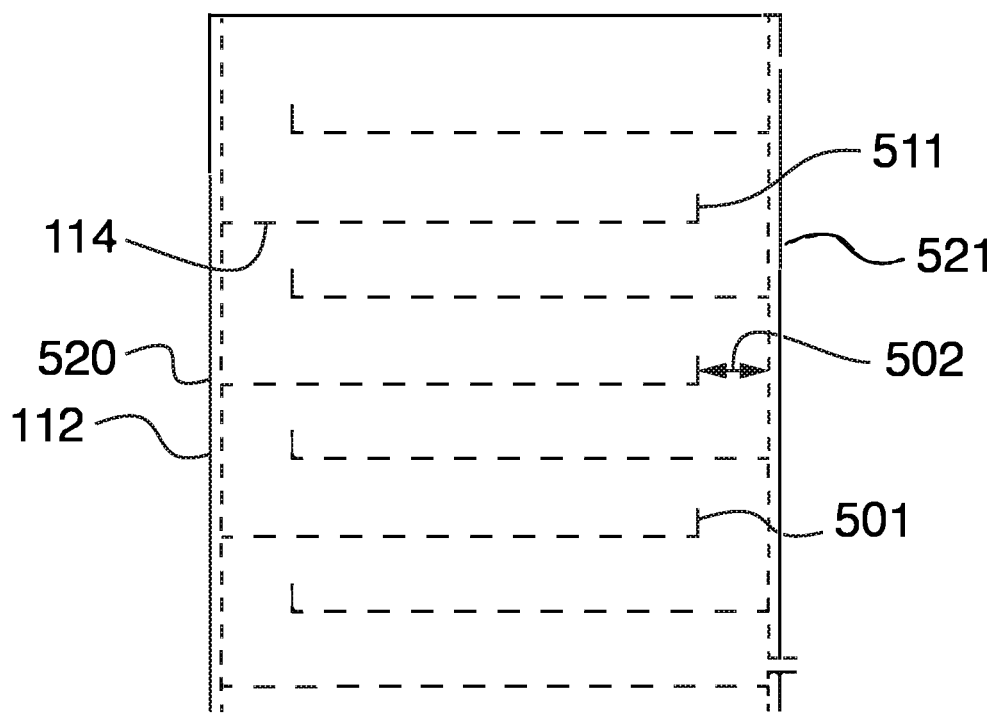
FIG. 5A is a cutaway side view of several desorber shelves comprising a fluid bed regenerative thermal oxidizer according to an embodiment.

FIG. 5A is a cutaway side view of several desorber shelves 114 according to an embodiment. The desorber shelves 114 can be located at the upper end 112 of the vertical reactor stack 110 as shown in FIG. 1. In an embodiment, each desorber shelf 114 can comprise an edge 511 that does not extend fully to the vertical reactor stack left wall 520 and right wall 521. The edge 511 creates an empty space 502 between the edge 511 and the vertical reactor stack left wall 520 or right wall 521. The edge 511 of each desorber shelf 114 can be located either nearest to the left wall 520 or the right wall 521. In an embodiment, each desorber shelf 114 can comprise a lip 501 located at the edge 511 of the desorber shelf 114.

Figure 5B:
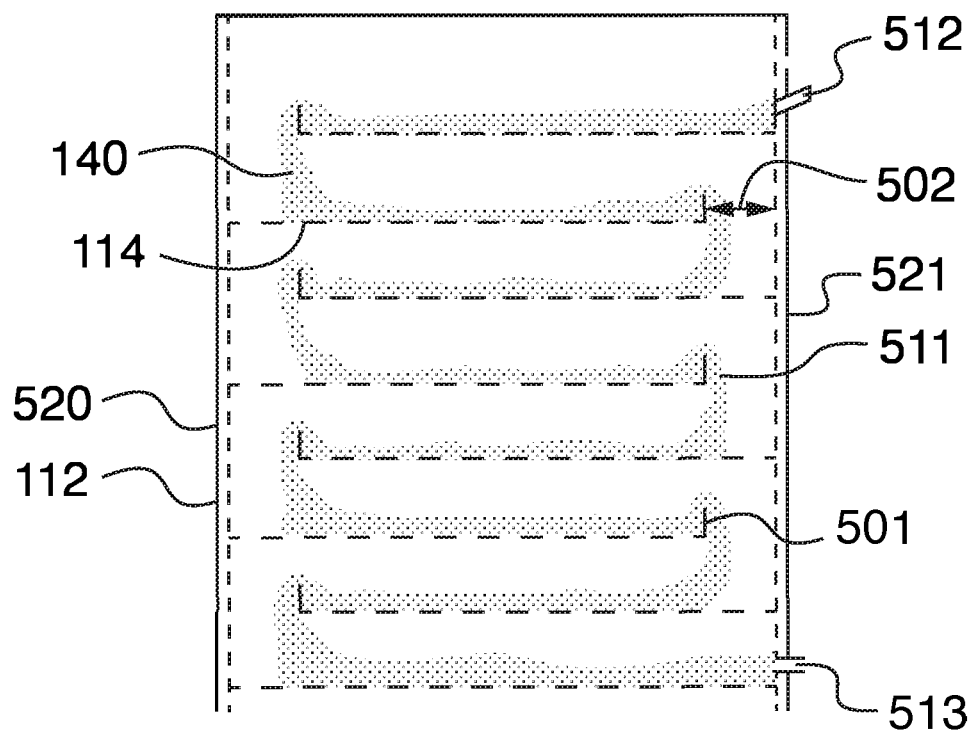
FIG. 5B is a cutaway side view of several desorber shelves comprising a fluid bed regenerative thermal oxidizer wherein each shelf if shown to contain heat exchange material according to an embodiment.

FIG. 5B is a cutaway side view of several desorber shelves 114 wherein each shelf contains heat exchange material 140 according to an embodiment. The heat exchange material 140 can move across the desorber shelves 114 and down through the upper end 112 of the vertical reactor stack 110 as shown in FIG. 1. In an embodiment, the heat exchange material 140 can move from one desorber shelf 114 to another desorber shelf 114 located below it by passing through the empty space 502 created by the edge 511 of each desorber shelf 114 and the vertical reactor stack left wall 520 or right wall 521. The lip 501 on each desorber shelf 114 can allow the heat exchange material 140 located on the desorber shelf 114 to stay in place until sufficient force is placed upon the heat exchange material 140 to move the heat exchange material 140 downwards through the upper end 112 of the vertical reactor stack 110 as shown in FIG. 1. In an embodiment, the heat exchange material 140 can move from the upper container (not shown) and onto the desorber shelves 114 through an upper opening 512 and can move downward into the heating chamber 122 (not shown in FIG. 5B) through a lower opening 513.

Figure 6:
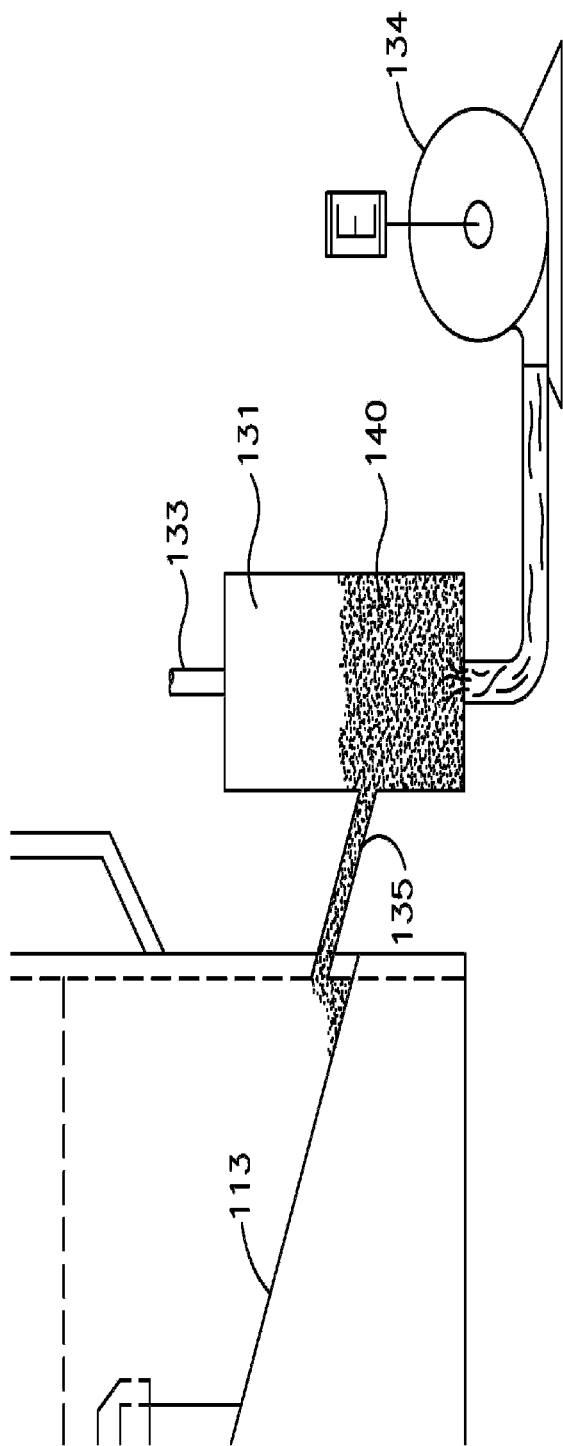
FIG. 6 is a front close-up cutaway view of a lower heat exchange container containing heat exchange material according to an embodiment.

FIG. 6 is a front close-up cutaway view of a lower heat exchange container 131 containing heat exchange material 140 according to an embodiment. The heat exchange material 140 can move from the adsorber shelves 113 into the lower heat exchange container 131 through a hollow tube 135. The heat exchange material 140 can accumulate in the lower container 131. The heat exchange material 140 can move from the lower container 131 to an upper heat exchange container (not shown) through a vertical hollow tube 133. In an embodiment, the lower container 131 can comprise a rectangular shape. In an embodiment, an airlift blower 134 can move the heat exchange material 140 out of the lower container 131 and upwards through the vertical hollow tube 133.

Figure 7:
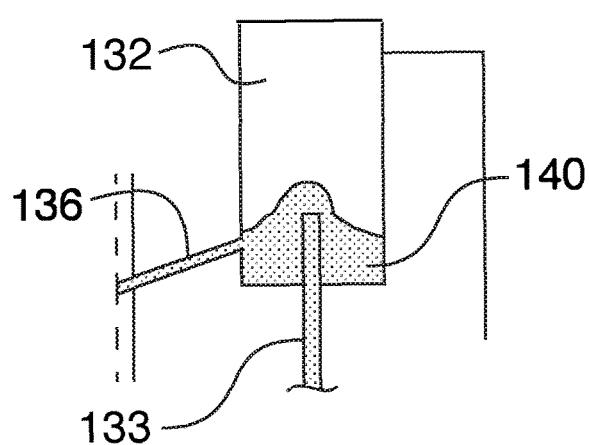
FIG. 7 is a front close-up cutaway view of an upper heat exchange container containing heat exchange material according to an embodiment.

FIG. 7 is a front close-up cutaway view of an upper heat exchange container 132 containing heat exchange material 140 according to an embodiment. The heat exchange material 140 can move from the lower container (not shown in FIG. 7) into the upper heat exchange container 132 through the vertical hollow tube 133. The heat exchange material 140 can accumulate in the upper heat exchange container 132. The heat exchange material 140 can move from the upper container 132 to the desorber shelves (not shown in FIG. 7) through a hollow tube 136. In an embodiment, the upper container 132 can comprise a rectangular shape.

Figure 8:
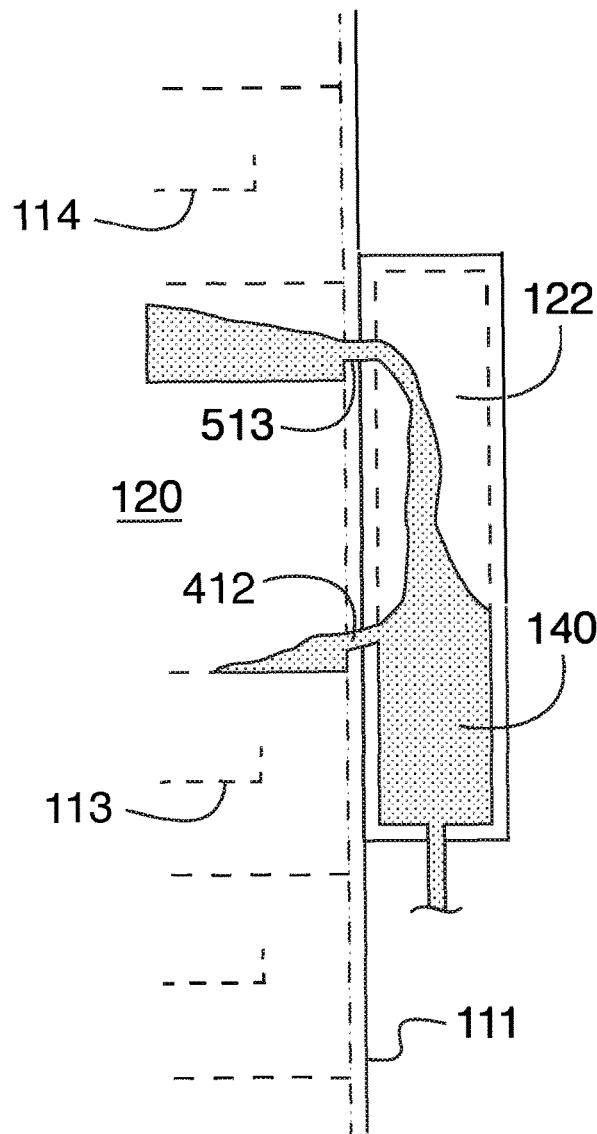
FIG. 8 is a front close-up cutaway view of a heating chamber containing heat exchange material according to an embodiment.

FIG. 8 is a front close-up cutaway view of a heating chamber 122 containing heat exchange material 140 according to an embodiment. The heating chamber 122 can be located outside of the vertical reactor stack 110 shown in FIG. 1 and can be located to the side of the combustion chamber 120. In an embodiment, the heating exchange material 140 can flow from the desorber shelves 114 into the heating chamber 122 through an upper opening 513. The heating exchange material 140 can accumulate in the heating chamber 122. In an embodiment, the heating exchange material 140 can move from the heating chamber 122 onto the adsorber shelves 113 through the upper opening 412. In another embodiment, the heating exchange material can bypass the adsorber shelves 113 and move through a hollow bypass tube 123 to the lower end 111 of the vertical reactor stack 110 shown in FIG. 1.

Figure 9:
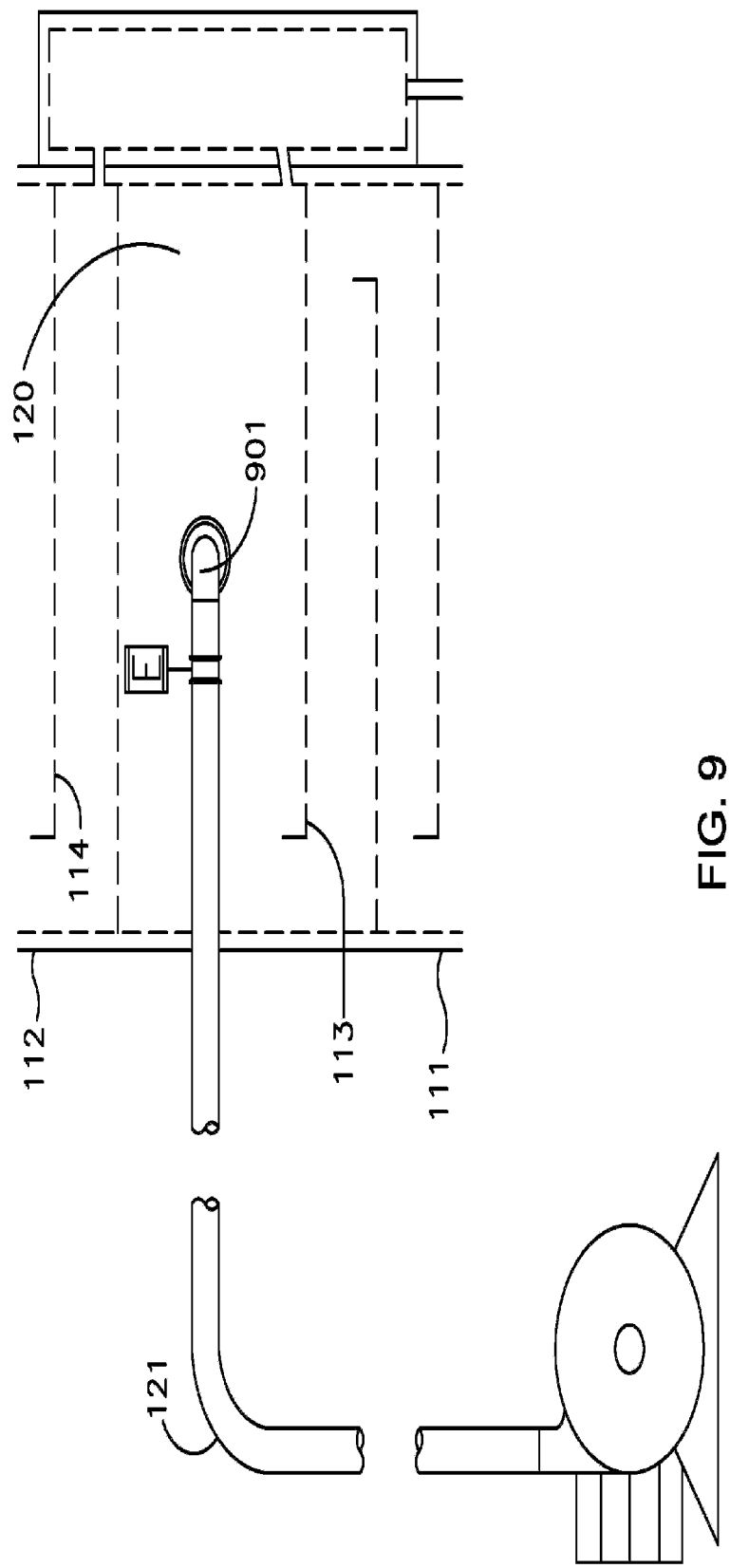
FIG. 9 is a front close-up cutaway view of a combustion chamber according to an embodiment.

FIG. 9 is a front close-up cutaway view of a combustion chamber 120 according to an embodiment. The combustion chamber can be located in the vertical reactor stack 110 in FIG. 1 below the desorber shelves 114 and above the adsorber shelves 113. In an embodiment, the combustion chamber 120 can house the combustion of polluted air that flows into the vertical reactor stack 110 through the gas inlet (not shown). The combustion chamber 102 can contain a fuel burner 901. A combustion fuel (not shown in FIG. 9) can be introduced into the combustion chamber 120 through a pipe 121 and can comprise natural gas or any other suitable combustible fuel. The combustion fuel and the fuel burner 901 can be used to combust polluted air into cleaned air. The polluted air can enter the combustion chamber 120 after flowing upwards through the lower end 111 of the vertical reactor stack 110 as shown in FIG. 1. The combusted air can then leave the combustion chamber 120 and can travel upwards through the upper end 112 of the vertical reactor stack 110.

Figure 10:
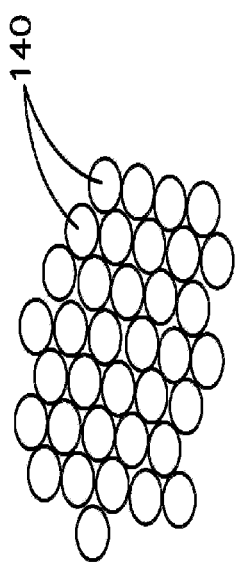
FIG. 10 is a front view of a spherical ceramic heat exchange material according to an embodiment.

FIG. 10 is a front view of a spherical heat exchange material 140 according to an embodiment. In an embodiment, the heat exchange material 140 can be spherical in shape. The heat exchange material 140 can be uniform in size and/or shape and can be comprised of ceramic, glass, metal or any other suitable material.

Although the present devices and methods have been described in terms of exemplary embodiments, none is limited thereto. Rather, the appended claims should be construed broadly, to include other variants and embodiments of the present device and method, which may be made by those skilled in the art without departing from the scope and range of equivalents of either the device or method.

What is claimed is:

1. A method for using a fluid bed regenerative thermal oxidizer, the method comprising:

providing fluid bed regenerative thermal oxidizer comprising: a vertical reactor stack comprising a gas inlet at a lower end of the vertical reactor stack, a gas outlet located at an upper end of the vertical reactor stack and a combustion chamber located within the vertical reactor stack between the gas inlet and the gas outlet wherein the combustion chamber also comprises a fuel burner;

one or more adsorber shelf located within the vertical reactor stack and below the combustion chamber configured to allow air to flow through each adsorber shelf and also configured to contain the heat exchange material and allow the heat exchange material to move across each adsorber shelf and exit one end of each adsorber shelf;

one or more desorber shelf located within the vertical reactor stack and above the combustion chamber configured to allow air to flow through each desorber shelf and also configured to contain the heat exchange material and allow the heat exchange material to move across each desorber shelf and exit one end of each desorber shelf and onto one or more desorber shelf;

an upper heat exchange material container located near the upper end of the vertical reactor stack;

a lower heat exchange material container located near the lower end of the vertical reactor stack;

a vertical tube connecting the upper heat exchange material container and the lower heat exchange material container; and bypass connecting the lower end of the heating chamber to the lower end of the vertical stack;

providing heat exchange material;

providing a combustion gas; and adding combustion gas to the combustion chamber and igniting the combustion gas and the untreated gas to form a combusted gas; flowing the combusted gas through at least one desorber shelf containing heat exchange material to heat the heat exchange material; moving the heated heat exchange material from at least one desorber shelf to at least one adsorber shelf flowing the untreated gas though at least one adsorber shelf containing heated heat exchange material so that the untreated gas is heated by the heated heat exchange material and the heat exchange material is cooled by the untreated gas; moving the cooled heat exchange material from at least one adsorber shelf to at least one desorber shelf; and transporting heat exchange material from the lower end of the heating chamber into the lower end of the vertical stack through the bypass.

2. A method for using a fluid bed regenerative thermal oxidizer as recited in claim 1 wherein an airlift blower transports heat exchange material from the lower heat exchange material container through the vertical tube to the upper heat exchange material container.

3. A method for using a fluid bed regenerative thermal oxidizer as recited in claim 2 wherein a second desorber shelf is located below a first desorber shelf and the second desorber shelf also comprises a first end and a second end configured so that heat exchange material moves across the first end to the second end of the second desorber shelf and the second desorber shelf is positioned so that heat exchange material flowing from the second end of the first desorber shelf moves onto the first end of the second desorber shelf.

* * * * *